(12) United States Patent
Bender et al.

(10) Patent No.: US 10,521,756 B2
(45) Date of Patent: Dec. 31, 2019

(54) MANAGING DELIVERY OF ENVIRONMENTALLY SENSITIVE PRODUCTS

(71) Applicant: International Business Machines Corporation, Armonk, NY (US)

(72) Inventors: Michael Bender, Rye Brook, NY (US); Rhonda L. Childress, Austin, TX (US); Kim A. Eckert, Austin, TX (US); Ryan D. McNair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 15/173,120

(22) Filed: Jun. 3, 2016

(65) Prior Publication Data

US 2017/0351998 A1  Dec. 7, 2017

(51) Int. Cl.
  *G06Q 10/08* (2012.01)
(52) U.S. Cl.
  CPC .................. *G06Q 10/0832* (2013.01)
(58) Field of Classification Search
  CPC .................................... G06Q 10/0832
  USPC ........................................................ 705/332
  See application file for complete search history.

(56) References Cited

U.S. PATENT DOCUMENTS

| | | | |
|---|---|---|---|
| 6,510,383 B1 * | 1/2003 | Jones | G01C 21/343 340/993 |
| 7,630,864 B2 | 12/2009 | Shoenfeld | |
| 7,991,653 B2 | 8/2011 | Factor et al. | |
| 8,063,735 B2 | 11/2011 | Shoenfeld | |
| 9,378,479 B2 | 6/2016 | Seifen | |
| 2001/0042024 A1 | 11/2001 | Rogers | |
| 2004/0225507 A1 * | 11/2004 | Smith | G06Q 10/025 705/6 |

(Continued)

FOREIGN PATENT DOCUMENTS

| | | | |
|---|---|---|---|
| EP | 3099989 A1 | 12/2016 | |
| WO | 2011038018 A1 | 3/2011 | |
| WO | WO-2011037800 A2 * | 3/2011 | G06Q 10/0833 |

OTHER PUBLICATIONS

AmCraft Manufacturing. Climate Curtains and Temperature Curtains for Warehouse Spaces. Oct. 9, 2014. http://web.archive.org/web/20141009050201/https://www.amcraftindustrialcurtainwall.com/climate-curtains-warehouse-spaces/ (Year: 2014).*

(Continued)

*Primary Examiner* — Shannon S Campbell
*Assistant Examiner* — Lisa Ma
(74) *Attorney, Agent, or Firm* — Alexander G. Jochym

(57) ABSTRACT

A method, executed by one or more processors, includes identifying at least one product for delivery and create a shipping manifest for the at least one product. The method includes extracting from the shipping manifest, a required amount of storage space for the at least one product and one or more environmental conditions required for storage of the at least one product at the receiving location. Furthermore, the method includes identifying a storage space location for storage of the at least one product at the receiving location, wherein the identified storage space location provides the required amount of storage space and the one or more environmental conditions required for the at least one product.

20 Claims, 7 Drawing Sheets

(56) References Cited

U.S. PATENT DOCUMENTS

| | | | |
|---|---|---|---|
| 2006/0020366 A1 | 1/2006 | Bloom | |
| 2009/0043617 A1 | 2/2009 | Thomas | |
| 2009/0184818 A1 | 7/2009 | Murphy et al. | |
| 2010/0082152 A1* | 4/2010 | Mishra | G06Q 10/08 700/226 |
| 2012/0055180 A1* | 3/2012 | Larson | B60H 1/00014 62/80 |
| 2014/0330603 A1* | 11/2014 | Corder | G06Q 10/0631 705/7.12 |
| 2015/0120602 A1* | 4/2015 | Huffman | G06Q 10/083 705/339 |
| 2015/0193731 A1* | 7/2015 | Stevens | G06Q 10/083 705/26.7 |
| 2016/0025549 A1* | 1/2016 | Motoyama | G01G 19/414 177/1 |
| 2016/0180135 A1 | 6/2016 | Dearing et al. | |
| 2017/0083864 A1* | 3/2017 | Saito | G06Q 30/0635 |

OTHER PUBLICATIONS

Bender et al., "Managing Delivery of Environmentally Sensitive Products", U.S. Appl. No. 15/663,366, filed Jul. 28, 2017.

Appendix P—List of IBM Patents or Patent Applications Treated as Related, Filed Herewith, 2 Pages.

Brennan et al., "UPS, FedEx and DHL bet big on health-care logistics", CNBC, Oct. 2, 2015, 2 pages,<http://www.cnbc.com/2015/10/02/ups-fedex-and-dhl-bet-big-on-health-care-logistics.html>.

"ColdGuard® Sliding Cold Storage Doors", Chase Doors, printed on Mar. 18, 2016, 3 pages, <http://www.chasedoors.com/productdisplay.asp?productid=68>.

"FedEx Could Boost Supply Chain Revenues with the new Cardinal Health Alliance", Forbes, Trefis Ream-Contributor, Nov. 29, 2013, 5 pages, <http://www.forbes.com/sites/greatspeculations/2013/11/29/fedex-could-boost-supply-chain-revenues-with-the-new-cardinal-health-alliance/#5da7ecd551de>.

"FlexTherm® Insulated Curtains", TMI LLC Managing Environments, printed on Mar. 18, 2016, 2 pages, <http://www.tmi-pvc.com/industrial-curtain-solutions-flextherm-insulated-curtains-c-1_68_73-I-en.html>.

"Good things come from Sysco At-A-Glance", Sysco, printed on Mar. 18, 2016, 2 pages.

"Keep your cool when temperature or humidity-sensitive goods get shipped", Temperature and Humidity, Package Engineering, UPS, printed on Mar. 18, 2016, 2 pages.

"High Performance Computing based system for optimization and analyses in the LNG business", An IP.com Prior Art Database Technical Disclosure, IP.com No. IPCOM000234153D, IP.com Electronic Publication Date: Jan. 14, 2014, 9 pages, <http://ip.com/IPCOM/000234153>.

"System for Managing a Manufacturing Environment", An IP.com Prior Art Database Technical Disclosure, IP.com No. IPCOM000136244D, IP.com Electronic Publication Date: May 10, 2006, 28 pages, <http://ip.com/IPCOM/000136244>.

"Temperature & Humidity Monitoring", Innovative Medical Systems Inc., printed on Mar. 18, 2016, 8 pages, <file:///C:/Users/IBM_AD~1/AppData/Local/Temp/notes32C5CD/Temperature & Humidity Monitoring _ Innovative Medical Systems, Inc.htm>.

* cited by examiner

MANAGING DELIVERY OF ENVIRONMENTALLY SENSITIVE PRODUCTS

BACKGROUND OF THE INVENTION

The present invention relates generally to the field of physical distribution in supply chain management and more particularly to a method of managing the delivery and storage of environmentally sensitive products.

The internet of things includes the network of physical objects such as vehicles, devices, containers, buildings and other items with embedded electronics, software, sensors and network connectivity that enables the physical object sensors to collect and exchange data using network connectivity. The internet of things allows sensing of physical objects, and, in some cases, control of the physical objects remotely across existing network infrastructure thus, creating opportunities for integration of physical world objects into computer-based systems for increased efficiency.

SUMMARY

Embodiments of the present invention disclose a method, a computer program product and a system for one or more computers to identify at least one product for delivery and create a shipping manifest for the at least one product. The method includes one or more computers extracting from the shipping manifest, a required amount of storage space for the at least one product and one or more environmental conditions required for storage of the at least one product at the receiving location. Furthermore, the method includes one or more computers identifying a storage space location for storage of the at least one product at the receiving location, wherein the identified storage space location provides the required amount of storage space and the one or more environmental conditions required for the at least one product.

DETAILED DESCRIPTION

Embodiments of the present invention recognize that various raw materials such as temperature or humidity sensitive chemicals, electronic components, produce (milk, fruit, meat, vegetables, etc.), and various assembled products (delicate electronics, medical devices, etc.), for example, require specific environmental conditions to ensure product integrity or functionality upon delivery from a supplier to a receiving location.

Embodiments of the present invention provide a method to manage delivery and storage of environmentally sensitive products at a receiving location using sensors on a vehicle, identification tags in shipping containers, and a shipping manifest generated from information extracted from one or more databases interconnected over a network such as the Internet. Embodiments of the present invention include using, at least, information extracted from a shipping manifest and one or more databases to determine the environmental conditions required for storing an environmentally sensitive product, in addition to determining the quantities of the environmentally sensitive products for delivery, one or more sizes of shipping containers used to deliver the environmentally sensitive product and a shipping container identification for each shipping container of the environmentally sensitive product for delivery at a receiving location.

Embodiments of the present invention include using extracted information from a shipping manifest and one or more databases to determine a location at the receiving location for storage of the environmentally sensitive product. Embodiments of the present invention provide a method to automatically identify and manage preparation of the required amount of storage space with the required environmental conditions at the receiving location based, at least in part, on the information extracted from a shipping manifest. Furthermore, embodiments of the present invention include a method to provide access delivery to the receiving location and to one or more storage locations identified for the storage of the environmentally sensitive products. Additionally, embodiments of the present invention include providing a method to verify the correct storage location and the correct quantity of environmentally sensitive product delivered to the receiving location.

Figure 1:
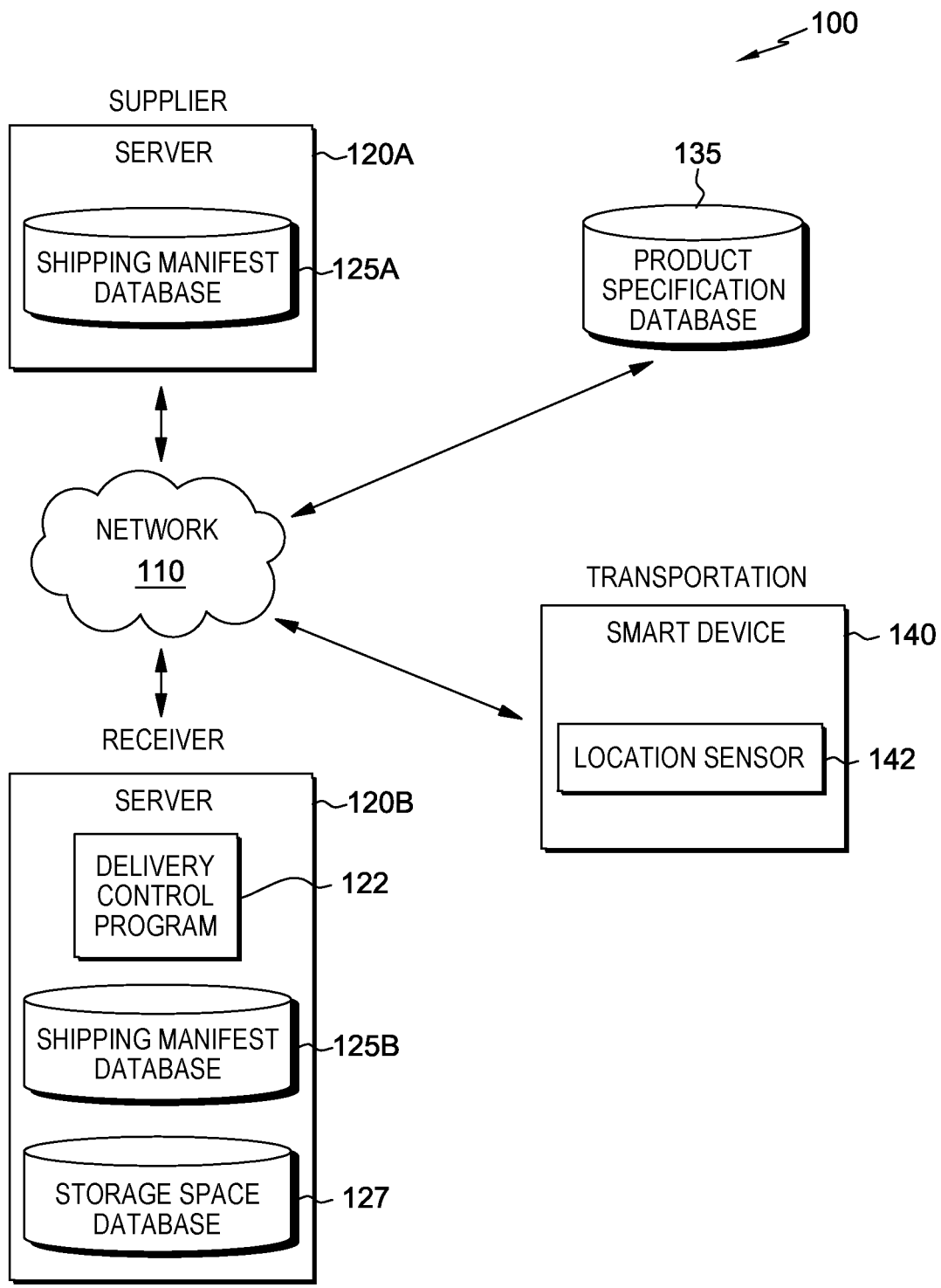
FIG. 1 is a functional block diagram illustrating a distributed data processing environment, in accordance with at least one embodiment of the present invention.

FIG. 1 is a functional block diagram illustrating a distributed data processing environment 100, in accordance with at least one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

As depicted, distributed data processing environment 100 includes server 120A and 120B, product specification database 135 and smart device 140 interconnected over network 110. Network 110 can include, for example, a telecommunications network, a local area network (LAN), a virtual LAN (VLAN), a wide area network (WAN), such as the Internet or a combination of these and can include wired or wireless connections. Network 110 can include one or more wired and/or wireless networks that are capable of receiving and transmitting data such as a global position system (GPS) location or a shipping manifest. In general, network 110 can be any combination of connections and protocols that will support communications between server 120A and 120B, product specification database 135 and smart device 140 and other computing devices (not shown) within distributed data processing environment 100.

Servers 120A and 120B may each be a server, a management server, a web server, a mainframe computer or any other electronic device or computing system capable of receiving, sending and processing data. In various embodiments, server 120A and 120B represent a computing system utilizing clustered computers and components (e.g., database server computers, application servers, etc.) that act as a single pool of seamless resources such as used in a cloud-computing environment when accessed within distributed data processing environment 100. In another embodiment, servers 120A and 120B can be a laptop computer, a tablet computer, a netbook computer, a notebook computer, a mobile computing device, a personal computer (PC), a desktop computer, a personal digital assistant (PDA), a smart phone or any programmable electronic device capable of communicating with product specification database 135 and smart device 140 via network 110. Servers 120A and 120B may include internal and external hardware components, as depicted and described in further detail with respect to FIG. 5. As depicted in FIG. 1, server 120A at the supplier includes shipping manifest database 125A while server 120B at the receiving location includes delivery control program 122, shipping manifest database 125B and storage space database 127. In various embodiments, although not depicted in FIG. 1, server 120A also includes a storage space database 127.

Delivery control program 122 on server 120B includes the programming code and routines for providing a method to deliver and store products that may be environmentally sensitive and require specific environmental conditions for storage. FIG. 1 depicts delivery control program 122 on server 120B, however in an embodiment, delivery control program 122 resides on server 120A. In various embodiments, a single delivery control program residing in a cloud environment composed of a group of interconnected computers or on a server (not depicted in FIG. 1) that provides a method to deliver environmentally sensitive products using a shipping manifest.

Delivery control program 122 may create, or generate, a shipping manifest using information retrieved from product specification database 135 for a product identified by an order fulfillment system, a shipping request, a shipment-tracking database, or a purchase order generated by an order fulfillment system, a supply chain system, another system or a user at the receiving location. In an embodiment, a distribution or shipping system, an order fulfillment system, a supply chain system, another system, tool or user at the supplying location may identify one or more environmentally sensitive products for shipping to a receiving location. Delivery control program 122 creates a shipping manifest electronically that may be sent to server 120A at the receiving location and to shipping manifest database 125B.

Deliver control program 122 may send and receive data from server 120A, server 120B, product specification database 135 and smart device 140 such as environmental conditions required by the product or a location of an identified storage space for the product. Delivery control program 122 may determine a location with the required amount of storage space with the required environmental conditions and provide access to a facility at the receiving location for storage of a delivered product. Additionally, delivery control program 122 provides a method of verifying the delivery and storage of a product and providing access to a facility at the receiving location for a driver or deliverer access.

Shipping manifest databases 125A and 125B are databases that store shipping manifests on servers 120A and 120B respectively. Shipping manifest databases 125A and 125B may send and receive data from servers 120A and 120B, product specification database 135 and smart device 140. In an embodiment, shipping manifest databases 125A and 125B reside on one or more computing devices (not shown in FIG. 1). Shipping manifest databases 125A and 125B may retrieve data for and receive data from servers 120A and 120B, product specification database 135 and smart device 140.

Storage space database 127 on server 120B at the receiving location is a database that stores information on storage space at the receiving location. Storage space database 127 may receive information such as a type of environmental conditions supported by a storage area and retrieve data for server 120A and 120B, delivery control program 122 and smart device 140. In an embodiment, storage space database 127 is included in a warehouse management system.

Product specification database 135 is a database that stores product specifications, including, for example, environmental conditions for handling and storage of each product, product attributes (e.g., product size), shipping container sizes and the quantity of product associated with each shipping container size. Product specification database 135 resides on one or more computing devices or servers (not depicted in FIG. 1). For example, product specification database 135 may reside on a mainframe or more than one interconnected computer systems as may be used in a cloud environment. Product specification database 135 may send and receive data from servers 120A and 120B and smart device 140. While depicted as single databases, in various embodiments, product specification database 135, shipping manifest databases 125A and 125B and storage space database 127 are included in one or more databases.

Smart device 140 may be a smart phone, a wearable computer, a tablet, a mobile computing device, a hand-held computer, a notebook or a smart device integrated into a transport vehicle such as an integrated, on-board computing device in a delivery truck or van. Smart device 140 includes location sensor 142 that may be a global positioning system (GPS) or other known location determination device. Smart device 140 may send and receive information such as location queries and current location information (e.g., a GPS location) to server 120A and 120B via network 110.

Figure 2:
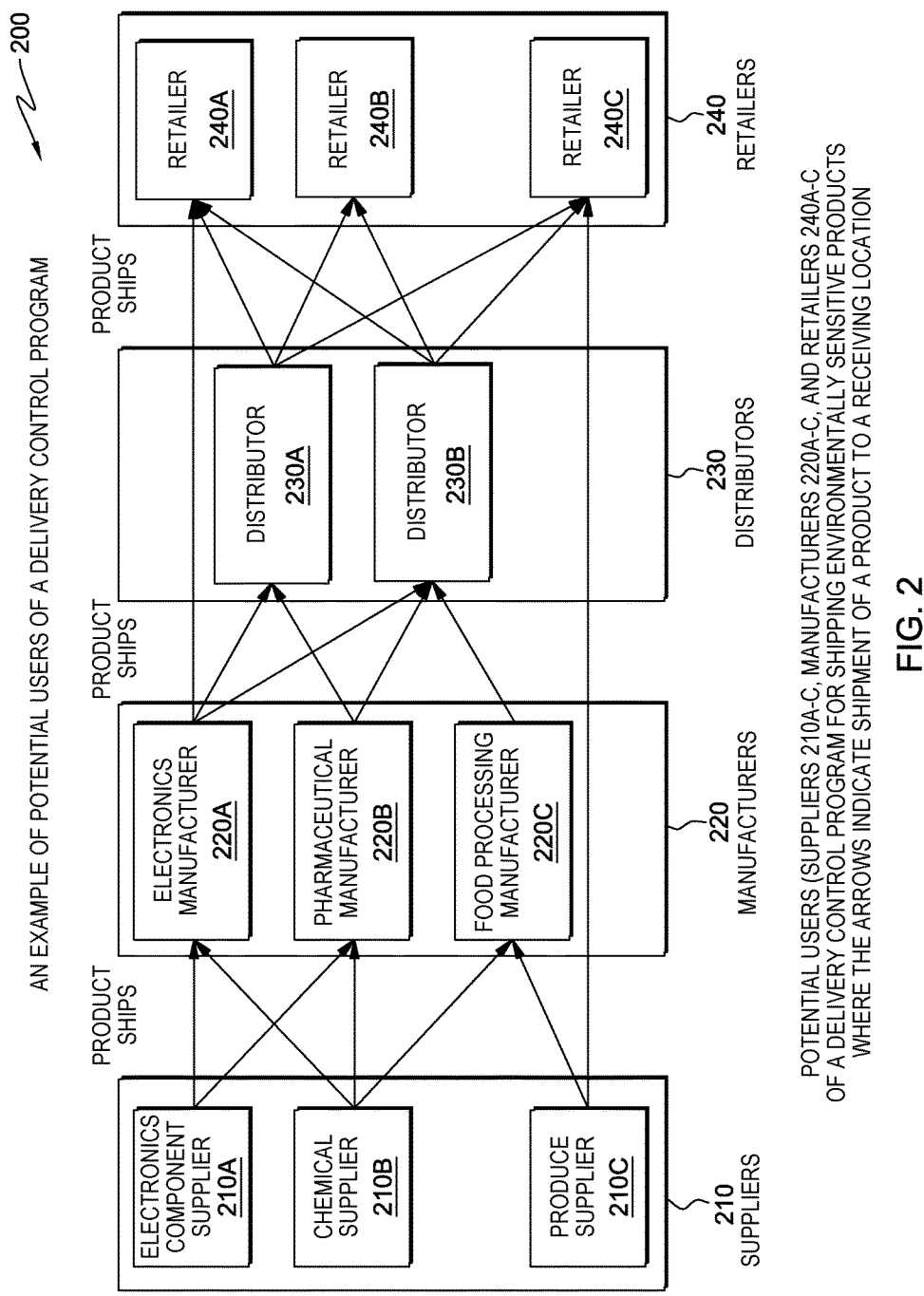
FIG. 2 is an illustration of an example of users of a delivery control program for environmentally sensitive products, in accordance with at least one embodiment of the present invention.

FIG. 2 is an illustration 200 of an example of potential users of delivery control program 122 for environmentally sensitive products, in accordance with at least one embodiment of the present invention. As depicted in FIG. 2, the arrows indicate potential product shipments from a supplier to one or more receiving locations. Additionally, FIG. 2 illustrates that a receiving location such as manufacturers 220 may become a supplier to one or more other receiving locations such as distributors 230A-B and retailers 240.

FIG. 2 depicts shipping by a supplier such as suppliers 210A, B, C to a receiving location such as manufacturers 220A, B, C of various products that require specific environmental conditions for storage. The specific environmental conditions for the products may be identified and provided include, for example, a range of temperatures or a range of humidity levels to provide functionality of the product(s) using delivery control program 122. The arrows between suppliers 210A-C, manufacturers 220A-C, distributors 230A-B and retailers 240A, B, C depict shipments of an environmentally sensitive product from a supplier to one or more receiving locations, however, shipments of environmentally sensitive products are not limited to the depicted arrows but could also occur between one or more of suppliers 210A-C to one or more distributors 230A-C, retailers 240A-C, in addition to other receiving locations not depicted in FIG. 2.

The shipment of one or more environmentally sensitive product from suppliers 210A-C to manufacturers 220A-C may occur using a using a delivery control method that may be executed by a delivery control program in server or residing in a cloud computing environment. Additionally, manufacturers 220A may use a delivery control program to ensure that any environmentally sensitive products shipped to a receiving location such as distributors 230A-B or retailers 240A-C are properly received and stored. Similarly, distributors 230A-B may use a delivery control program to ensure that retailers 240A-C receive and properly store any environmentally sensitive products according to product specifications. FIG. 2 is a representative example of potential users of a delivery control program, such as delivery control program 122, however; many other potential users such as archeologists and art collectors sending delicate artifacts and/or artwork to a museum and other suppliers sending environmentally sensitive products to a receiving location may use a delivery control program such as delivery control program 122.

Figure 3:
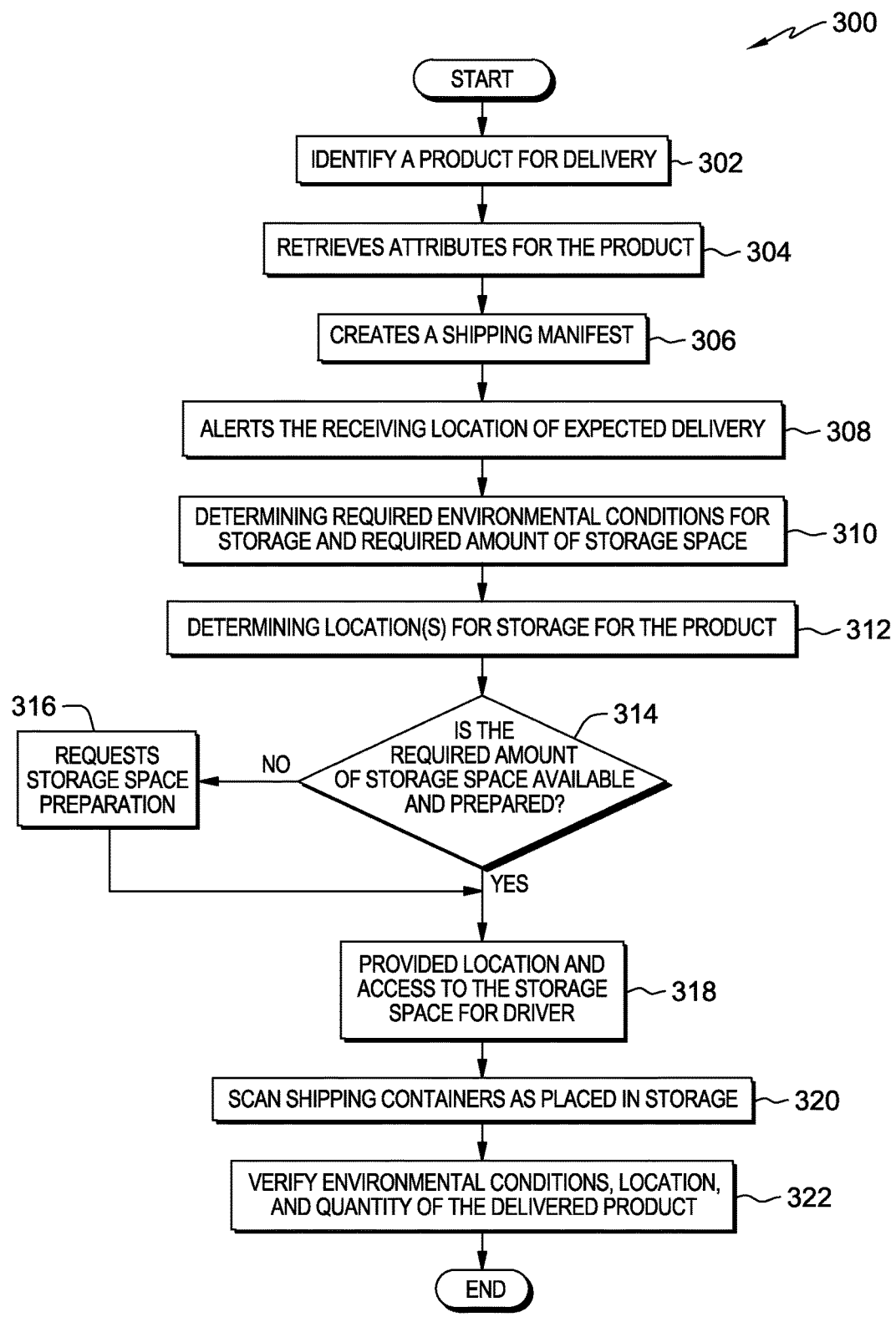
FIG. 3 is a flow chart depicting a delivery control method for an environmentally sensitive product, in accordance with at least one embodiment of the present invention.

FIG. 3 is a flow chart depicting a delivery control method 300 for an environmentally sensitive product in accordance with at least one embodiment of the present invention. As depicted, FIG. 3 includes the steps an embodiment of a delivery control program executed on a server at the receiving location (e.g., delivery control program 122 depicted on server 120B in FIG. 1) for managing delivery of environmentally sensitive products from a supplier to an identified storage space at the receiving location. In an embodiment, delivery control method 300 is executed by a remote server or a computer system that is a computing system utilizing clustered computers and that act as a single pool of seamless resources such as used in a cloud-computing environment. Delivery control method 300 creates and uses a shipping manifest for a product to determine environmental conditions for a storage space and an amount of storage space, to locate and prepare storage space for a product and to provide access to storage space for a transporter delivering the product.

Delivery control method 300 includes identifying a product for delivery (302). Delivery control method 300 may automatically identify a product from a line in a purchase order, an entry in a supply chain management tool, a shipping request, a user request or other known product delivery tool, system or method for requesting product deliveries. Delivery control method 300 identification of a product includes, at least, recording a quantity of product ordered, a location for product delivery and a unique product identifier that may be product name, a product number or a product barcode, for example, and a shipping container identifier for each shipping container containing the identified product.

Using the product identifier such as a product name or part number, delivery control method 300 includes retrieving attributes for the product (304) from a product specification database (e.g., product specification database 135 in FIG. 1). The product specification database includes environmental requirements for the product. Environmental requirements for an environmentally sensitive product may include a required temperature or temperature range, a humidity level and/or a range of humidity levels, a maximum vibration level, a special containment atmosphere (e.g., a specific gaseous atmosphere condition or environment) and any other specified product requirements such as flammability protection for transportation and storage. Delivery control method 300 retrieves attributes for the product including a product size, type of product, one or more shipping container sizes for the product and amount of the product associated with each shipping container size.

Delivery control method 300 includes creating a shipping manifest (306). A shipping manifest is a digital or electronic document or file automatically created based, at least in part, on information extracted from a product specification database (e.g., product specification database 135 in FIG. 1) for the identified product(s). The shipping manifest may include information such as a delivery location, a product(s), attributes for the product including product identifier, required environmental conditions, product quantity, product size, shipping container sizes, quantity of product per shipping container, number of shipping containers by size, an amount of storage space for a product and a shipping container identification. A shipping container identification may be a radio frequency identification (RFID) tag, near field communication (NFC) tag, quick response (QR) codes, Universal Product Code (UPC) barcode or the like. A shipping container identification may be a unique identifier for the shipping container that may be placed in a shipping container during packaging and automatically recorded by the packaging equipment or by a user. Delivery control method 300 records the shipping container identification for each shipping container of the product in the shipping manifest. The shipping container identification or identification tags may be read or scanned upon delivery of the product to the receiving location.

The generation of a shipping manifest is discussed in terms of a product; however, as known to one skilled in the art, a shipping manifest may contain information on many products. For example, a shipping manifest may include ten products for shipment to a receiving location each of which may have one or more lines of information relating to each product.

Upon completion of the shipping manifest, delivery control method 300 sends the shipping manifest to a database at the receiving location (e.g., shipping manifest database 125B) and a server at the supplier location (e.g., server 120A). In various embodiments, when delivery control method 300 is executed by a server at a remote location (e.g., a server that may be a part of a cloud environment) the shipping manifest is sent to servers at both the supplier location and the receiving location. The shipping manifest may be stored in a database such as shipping manifest database 125A on server 120A at the supplier's location and shipping manifest database 125B on server 120B at the receiver's location. In an embodiment, delivery control method 300 sends the shipping manifest to a database on one or more computers (not shown in FIG. 1). In some embodiments, delivery control method 300 sends the shipping manifest to a smart device (e.g., smart device 140) in the transporter (e.g., a truck) taking the product from the supplier location to the receiving location.

Delivery control method 300 includes alerting a receiving location of an expected delivery (308). A transporter such as a delivery van, a train or a tractor-trailer may transport the product from the supplier to a receiving location. Delivery control method 300 includes polling smart device (e.g., smart device 140 in FIG. 1) in the transporter with location determination capability to determine a current location and an expected arrival time. The smart device using a location sensor such as location sensor 142 may use known methods such as a global positioning system (GPS), for location tracking. Additionally, delivery control method 300 includes receiving an expected arrival time from the smart device accompanying the transporter. In an embodiment, delivery control method 300 receives the current location from the smart device with the transporter shipping the product and determines the expected arrival time using known methods of determining a travel time.

Delivery control method 300 periodically polls the smart device such as smart device 140 in the transporter to receive a current location to determine when the transporter begins travel. In an embodiment, when the transporter begins travel, delivery control method 300 includes sending an expected arrival time to the receiving location.

In various embodiments, delivery control method 300 polls a smart device (e.g., smart device 140) in the transporter for a current location and an expected arrival time based on a pre-determined schedule. For example, delivery control method 300 includes polling the smart device with the transporter for a current location on a pre-determined schedule such as five hours before an estimated arrival time and then, polling the smart device for a current location and an expected arrival time every hour until the transporter is one hour away then, polling the smart device for a current location and expected arrival time every twenty minutes until arrival at the receiving location. In an embodiment, delivery control method 300 sends an alert with the expected arrival time to the receiving location when the transporter is at one or more pre-set expected arrival times. For example, delivery control method 300 sends an alert to the receiving location when expected arrival time is five hours away from the current time, one hour away from the current time and twenty minutes away from the current time.

In an embodiment, delivery control method 300 generates an alert to the receiving location with an updated or adjusted expected arrival time when the current expected arrival time from the smart device in the transporter is a pre-set amount of time different from the last expected arrival sent to the receiving location. For example, an adjusted expected arrival time is sent when the current expected arrival time (e.g., based on a current location received from the smart device) is thirty minutes later than the last received expected arrival time sent to the receiving location.

Upon receiving a first alert of an expected arrival time at the receiving location, delivery control method 300 includes determining required environmental conditions for product storage and a required amount of storage space (310). Delivery control method 300 includes retrieving the shipping manifest associated with the product from a database such as shipping manifest database 125B at the receiving location. In an embodiment, delivery control method 300 includes retrieving the shipping manifest from a database on one or more servers or computers not residing at the receiving location (e.g., from a server in the cloud). Using information extracted from the shipping manifest, delivery control method 300 determines the required environmental conditions for the product. For example, the information included on the shipping manifest for the product may identify the product as a liquid chemical product that needs to maintain a temperature range of 50-55 degrees Fahrenheit to maintain desired chemical properties. In another example, delivery control method 300 may extract information on a dry food product for delivery from the shipping manifest that identifies the dry food product requires a low humidity (e.g., less than 30%) to maintain desired product attributes.

Additionally, delivery control method 300 includes determining a required amount of storage space for the product. Delivery control method 300 extracts information from the shipping manifest identifying the size of shipping containers used for transporting the product and the quantity of each size of shipping containers for the product. Using the extracted information (e.g., shipping container sizes for the product and quantities of each shipping container size), delivery control method 300 may determine the total amount of storage space required for the product when it arrives at the receiving location. In some embodiments, delivery control method 300 determines the amount of space required for the product based on the product size and the product quantity when the product is shipped without a shipping container or extra packaging. In this case, an identifier such as a QR code, a NFC tag or a barcode may be included on the product. In various embodiments, delivery control method 300 extracts the amount of storage space for the product from the shipping manifest.

Delivery control method 300 includes determining one or more locations in the storage space for the product (312). Using the required environmental conditions extracted from the shipping manifest and the determined amount of storage space, delivery control method 300 queries a storage space database that includes information on the amount of storage space in various areas at the receiving location, the location of each storage space area and the environmental conditions or environmental controls associated with each storage space. For example, delivery control method 300 may query a database such as storage space database 127 on server 120B at the receiving location for one or more storage locations or areas with the required amount of storage space for the product that is capable of providing the required environmental conditions. For example, a controlled humidity storage cabinet has sufficient amount of area for storing the product and is capable of maintaining 60% humidity although the storage space may not currently be at 60% humidity. In other embodiments, delivery control method 300 queries a warehouse management system, a supply line system or other digital data control program or system used to list, update and automatically manage storage space at the receiving location and to determine one or more locations with enough storage space and the ability to provide the required environmental conditions. In an embodiment, delivery control method 300 receives information on the location of one or more areas with the required amount of storage space from a user who performs a search of digital data, spreadsheets or other data such as files for storage space at a receiving location based, at least in part, on the amount of space required for the product capable of providing the required environmental conditions for storage of the product (e.g., extracted from a shipping manifest).

When delivery control method 300 receives one or more identified locations for the required storage space capable of providing the required environmental conditions, delivery control method 300 includes querying a storage management database at the receiving location to determine whether the required amount of storage space is available and prepared (decision 314). A prepared storage space is space that is currently ready at the required environmental conditions. For example, a product for delivery using delivery control method 300 requires a temperature of 50 degrees Fahrenheit for storage and ten cubic feet of storage space and a prepared storage space for the product would be ten cubic feet of storage space at 50 degrees Fahrenheit. In one embodiment, when delivery control method 300 determines that the expected arrival of the product is in one hour, delivery control method 300 includes querying the storage management database (e.g., storage space database 127 in FIG. 1) to verify the identified storage space is available and prepared.

Delivery control method 300 may search a database such as storage space database 127 at the receiving location, a database on one or more computers or servers in another location (e.g., in a cloud), a warehouse management system at the receiving location, a spreadsheet listing storage space or other known digital media or digital system to determine if one or more storage spaces are available and ready at the required environmental at a receiving location. In various embodiments, whenever more than one storage location that is available and is prepared, delivery control method 300 selects the storage location that is closest to the door or loading dock identified (e.g., in the shipping manifest) for receiving the delivery of the product.

If delivery control method 300 receives a reply to the query indicating that the required amount of storage space is not available and/or not prepared (no branch, decision 314), then delivery control method 300 requests storage space preparation (316). In various embodiments, delivery control method 300 includes sending a request or a command to a storage control system or an automated warehouse system capable of automatically changing a storage environment (e.g., a storage temperature) and/or automatically configuring or changing the size of a storage space to create a storage space with the required amount of storage space. For example, a storage space control system or an automated warehouse management system may re-configure or change the environmental conditions such a storage space humidity by changing an automated digital humidity control in the storage space.

In another example, a storage space system or an automated warehouse management system may create storage areas with different temperatures using one or more of movable thermal curtains and automated, adjustable temperature zones. In one other example, a storage space system or an automated warehouse management system may change a storage space size using automated sliding room dividers or use other known methods of re-configuring the amount of storage space. In various embodiments, delivery control method 300 includes a warehouse management system or other storage space management tool capable of generating a work order for an employee to change the amount of available storage space and/or change the environmental conditions of a storage space to meet product storage requirements.

For example, in the case of a refrigerated storage area with enough space but, set at an incorrect temperature for the product, delivery control method 300 may first query the shipping manifest database (e.g., shipping manifest database 125B) and/or a product specification database such as product specification database 135 for any of the products currently in the refrigerated storage area that cannot be stored at the required temperature as the product being delivered by the transporter. If all of the current products in the determined refrigerated storage area can be stored at the required temperature for the product being delivered, then delivery control method 300 initiates a request to an automated storage management system for a change to the temperature in the identified storage to the required temperature for the product being delivered.

In various embodiments, delivery control method 300 sends a request to change an environmental condition (e.g., a temperature) to one of an automated warehouse management system, a storage management system, an automated electronic control unit in the identified storage space location, or a pre-determined employee at the receiving location responsible for managing storage space. However, if the presence of other products that cannot be stored at the required product temperature for the product being transported to the receiving location, then delivery control method 300 may create a space in the existing identified location that can be isolated from the other products (e.g., currently stored products) in the identified storage space location. For example, delivery control method 300 may send a request to an automatically configurable storage space or an automated warehouse management system that can automatically separate spaces within a storage space by moving curtains such as insulated thermal curtains, moving dividers, moving container into a storage or other known methods to provide an isolated location in the identified storage space that can provide the required environmental conditions for storage of the product. The isolated location is prepared to provide the required environmental conditions such as a required temperature or humidity. In an embodiment, a work order, an e-mail request or an electronic message is generated by delivery control method 300 to a system or an employee to create the amount of required storage space and the required environmental conditions for the storage of the product (e.g., when there is not an automated system or when the automated system cannot locate or prepare the required storage space with the required environmental conditions).

In some cases, an identified storage location with the required amount of storage space is not available due to other products currently in storage. Delivery control method 300 includes issuing a request to generate a work order to clear a storage space in storage. The work order may go to an automated warehouse management system to create the amount of space required for the product in an area with the required environmental conditions. In an embodiment, delivery control method 300 creates a work order, an e-mail, text or other electronic notification to a user responsible for managing storage space at the receiving location. The user, in this case, ensures preparation and inputs or sends to delivery control method 300 (e.g., via a note or a direct input to delivery control program 122 at the receiving location) the location of the created storage space with the required environmental conditions for the product.

If delivery control method 300 determines that the required amount of storage space is available and prepared (yes branch, decision 314), then delivery control method 300 sends the storage space location and provides access for the driver (318). Delivery control method 300 includes providing a location for the identified storage space. A location for the storage space may be a room, a column, a floor, a grid location in a warehouse that may be identified by a sign or a painted identifier (e.g., an alpha, a numeric or an alphanumeric location identifier such as col. 2A or grid 3C), a GPS, indoor location system position or NFC tag location, a beacon location or other known method of identifying a storage location. For example, delivery control method 300 may send a location such as column 21 in cold storage area 330 in building 2 and an access code such as 3748Z9 for entry into building 2. As previously mentioned, when more than one storage location is available and prepared, delivery control method 300 selects the storage location with the required amount of prepared storage space that is closest to the door or loading dock identified for receiving the delivery of the product.

Delivery control method 300 provides access to the identified storage space for a driver or a deliverer responsible for unloading the product. For example, delivery control method 300 may send a request to server 120B and/or to a security system resident on server 120B to provide access to the storage facility and/or to the identified storage space. For example, delivery control method 300 may include providing one or more shipping container identifications from the shipping manifest for the product to a security system. The provided shipping container identifications (e.g., a NFC tag or RFID tag) may be used to provide access to the identified storage. In an embodiment, delivery control method includes using a geofence to provide access to the identified storage location or building. Using the shipping container identifications, the security system allows entrance into a facility and a specified storage location when the scanned shipping container identifications matches one or more shipping container identifications extracted from the shipping manifest (e.g., retrieved by delivery control method 300 from a database).

In various embodiments, delivery control method 300 sends the shipping container identifications for the product and an expected delivery time to a receiving location's security system. In this example, delivery control method 300 includes requesting the security system to allow entry of a driver or deliverer of the product into the facility and into the identified storage for a pre-determined amount of time around the expected arrival time of the transporter carrying the product. For example, the security system in response to a request from delivery control method 300 provides a two-hour window (e.g., from 1 pm to 3 pm) for entrance and delivery of the product around the expected arrival time (e.g., 2 pm) for entrance into the receiving location. In this example, access is provided to a driver or deliverer carrying one or more shipping containers with a shipping container identification that matches a shipping identification provided to the security system for receiving location entry and product delivery by delivery control method 300.

Delivery control method 300 includes scanning of each shipping container placed in storage (320). Delivery control method 300 includes scanning each shipping container placed in storage for the shipping container identification by a user such as the driver or other product deliverer. For example, the product deliverer scans or reads a shipping container identification or identification tag using an electronic device such as a hand-held scanner (e.g., an RF scanner), a smart phone, a smart watch, mobile electronic scanner, a fixed scanning device or other electronic device capable of recording the shipping container identifications or shipping container identification (ID) tags when the product is placed in the identified storage space. In an embodiment, a fixed scanner scans shipping container identifications at the entrance to the storage space.

Delivery control method 300 using shipping container identification scans and known locating systems such as NFC location systems, RFID system, high precision GPS, indoor positioning systems, hybrid location systems or the like may determine a location for the product placed in storage at the receiving location. Delivery control method 300 includes verifying the environmental conditions, the location, and the quantity of the delivered product (322) are correct. Cross-referencing the shipping manifest, the identified storage space location, and scanned data including a location of the delivered product, delivery control method 300 verifies that the location of the product, the quantity of the product, and the environmental conditions for the delivered product. Delivery control method 300 includes verifying that the number of cases of the delivered product scanned and the location of the scanned shipping containers as delivered at the receiving location matches the shipping manifest information and identified storage space from the storage management database (e.g., quantity of shipping cases for delivery matches the extracted information on the quantity of shipping containers for delivery from the shipping manifest and the location of the scanned shipping containers matches the identified storage space location provided to delivery control program 122 from shipping manifest database 125B on server 120B at the receiving location).

Delivery control method 300 may verify that environmental conditions required for the product from the shipping manifest match the environmental conditions in the identified storage space by verifying with a query to the storage management database based on or using the scanned location of the delivered product (i.e., actual storage space conditions from storage management database at the scanned location match the required environmental conditions in the shipping manifest).

If any of the cross-referenced information between the shipping manifest and the storage management system does not match based on the received scans of the shipping containers (e.g., the quantity of shipping containers delivered or the environmental conditions do not match), then delivery control method 300 sends an alert or message to a computing device with the transporter, at the supplier and at the receiving location informing each user of the mismatch or error in the product delivery. For example, delivery control method 300 may send a message or an alert, such as an audio alert or alarm (e.g., a ring, etc.), a physical alert such as a vibration of a hand-held smart device or smart watch on the driver to indicate to the driver or product deliverer that an incorrect placement of one or more shipping containers has occurred. In this example, delivery control method 300 may re-send the correct identified location to the driver's smart device (e.g., smart device 130) for display to the driver. In one embodiment, upon completion of the delivery of the product, delivery control method 300 sends a message to a computer at the supplier location, the receiving location and with the transporter documenting the number of shipping containers delivered (e.g., by size), the location where the shipping containers were placed, and the required environmental conditions for storage of the product.

Figure 4:
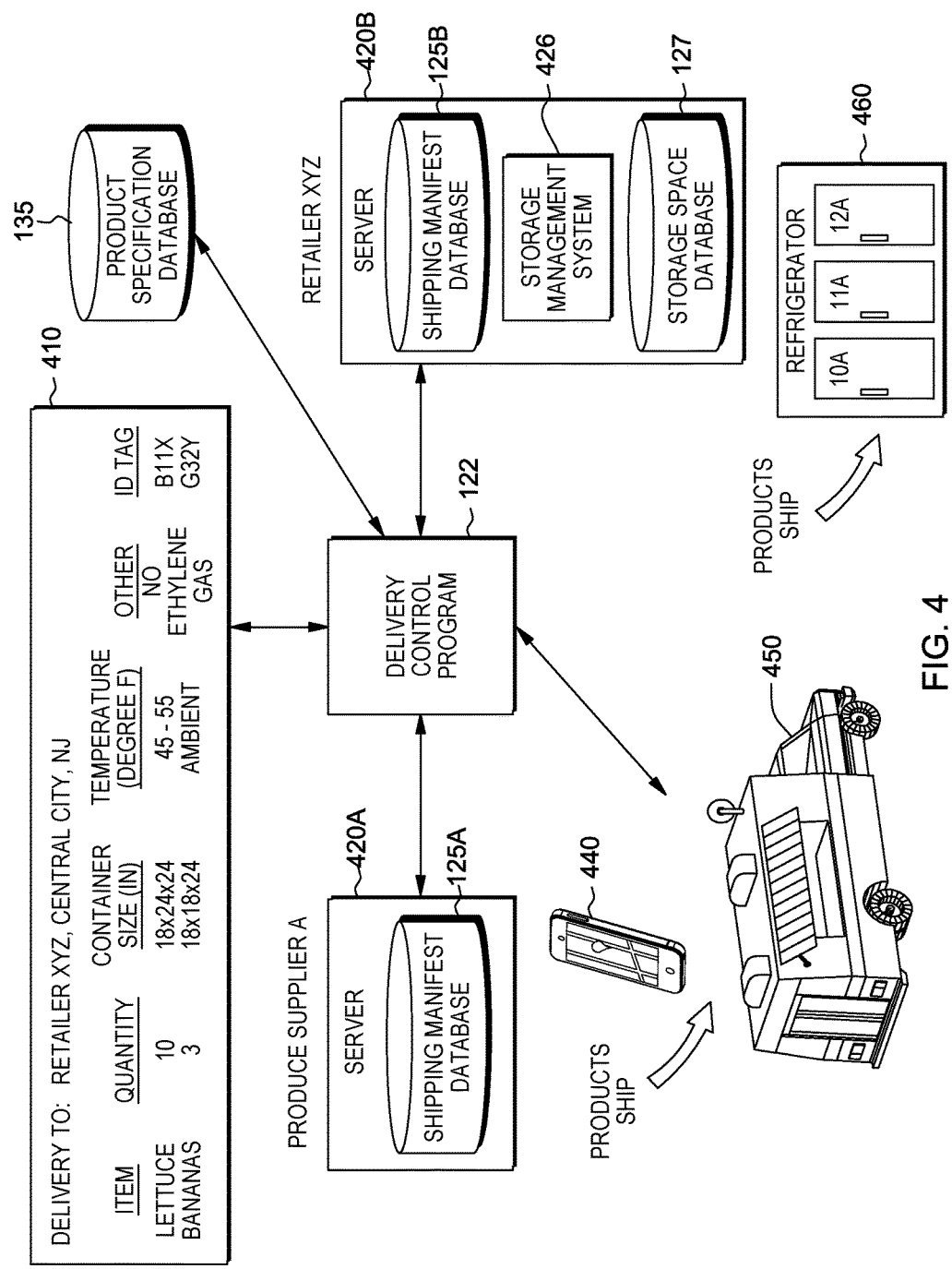
FIG. 4 is an illustration depicting an example of a delivery process for one or more environmentally sensitive products from a supplier to a retailer, in accordance with at least one embodiment of the present invention.

FIG. 4 is an illustration depicting an example of a delivery process for one or more environmentally sensitive products from a produce supplier A to a retailer XYZ in accordance with at least one embodiment of the present invention. As depicted, FIG. 4 includes produce supplier A (server 420A) shipping environmentally sensitive produce to retailer XYZ (server 420B) on truck 450 using delivery control program 122 on a server (not depicted in FIG. 4) and shipping manifest 410. The straight arrows between delivery control program 122, product specification database 135, shipping manifest 410, server 420A at produce supplier A, server 420B at retailer XYZ and smart phone 440 on truck 450 represent communications within network 110 as discussed in FIG. 1. The large, curved arrows (e.g., products ship 455) represent the travel or physical shipment of the environmentally sensitive products (e.g., lettuce and bananas) from produce supplier A to refrigerator 460 at retailer XYZ in truck 450. In various embodiments, delivery control program 122 resides in a cloud environment (e.g., a group of interconnected computers working together not depicted in FIG. 4). In one embodiment, a delivery control program 122 resides on server 420B at the receiving location.

Delivery control program 122 creates shipping manifest 410 for one or more products (e.g., lettuce and bananas) from a received purchased order or shipping request as previously discussed with respect to FIG. 3. Delivery control program 122 using product specifications extracted from product specification database 135 creates shipping manifest 410 for product delivery to retailer XYZ at Center City, N.J. (e.g., location of retailer XYZ). Delivery control program 122 sends shipping manifest 410 to shipping manifest database 425B at retailer XYZ at server 420A. In an embodiment, delivery control program 122 sends the shipping manifest to smart phone 440 with truck 450. Shipping manifest 410 indicates a shipment of three cases of bananas, not ripe, that require an ethylene gas environment and ten cases of lettuce requiring storage at 45 to 55 degrees Fahrenheit. Each case (i.e., shipping container) includes an identification tag (e.g., "G32Y" for a first case of bananas) recorded in shipping manifest 410.

A truck 450 loaded with the cases of bananas and the cases of lettuce begins transporting the produce. The truck driver's smart phone 440 tracks the GPS locations. Delivery control program 122 periodically polls smart phone 440 for a current GPS location and an expected delivery time to retailer XYZ. Upon receiving an initiation by a change in the GPS location of smart phone 440 that indicates a start of transit, delivery control program 122 may send to server 420B at retailer XYZ the expected delivery time. In one embodiment, smart phone 440 sends GPS locations and expected delivery times to both supplier A and retailer XYZ on a pre-determined schedule (e.g., every hour).

Upon receipt of an expected delivery time, delivery control program 122 retrieves shipping manifest 410 from shipping manifest database 425B. Delivery control program 122 may extract from shipping manifest 410 information to determine the amount of space required for storing the three cases of bananas and the ten cases of lettuce. Delivery control program 122 may send the required amount of storage space for each product (e.g., 12 cubic feet of storage space for three cases of bananas and 45 cubic feet of storage space for 10 cases of lettuce) to storage management system 426. Storage management system 426 may be an automated storage control system that monitors, allocates and directs creation and management of storage space in retailer XYZ. In an embodiment, storage management system 426 includes shipping manifest database 125B.

Delivery control program 122 extracts the environmental conditions required for storage of the three cases of bananas and the ten cases of lettuce from shipping manifest 410. The ten cases of lettuce require storage at temperatures of 45 to 55 degrees Fahrenheit. The bananas in the three cases of bananas are not ripe and require storage in an ethylene gas environment.

Using the extracted information on amount of space and environmental conditions for the cases of bananas and lettuce, delivery control program 122 determines that two storage spaces are required with two different environmental conditions. Delivery control program 122 queries storage management system 426 at retailer XYZ for availability of storage space with the required environmental conditions (e.g., amount of space, locations that provide environmental conditions of various storage areas).

Storage management system 426 is known storage management system as may be used in a warehouse, associated with a manufacturing environment, at a retailer or the like. Storage management system 426 may determine that refrigerator compartment 11A in refrigerator 460 has the required amount of storage space (e.g., 45 cubic feet) and is at the required temperature (e.g., 45 to 55 degrees Fahrenheit) for the ten cases of lettuce and returns the location of the identified storage space to delivery control program 122. Additionally, storage management system 426 determines that refrigerator compartment 12A is empty and has the required amount of space (e.g., 12 cubic feet) for the three cases of bananas and sends the location of refrigerator compartment 12A back to delivery control program 122.

Additionally, storage management system 426 determines that refrigerator compartment 12A is capable of providing an ethylene gas environment, although it is not currently turned on, and sends the information to delivery control program 122. In response to receiving this information, delivery control program 122 sends a request to storage management system 426 on server 420B to turn on the ethylene gas in refrigerator 12A one hour before the expected delivery of the three cases of bananas. In an embodiment, storage management system 426 determines that a storage space has the required amount of area and automatically adjusts the environmental conditions of refrigerator compartment 12A to the received environmental conditions (e.g., ethylene gas) from delivery control program 122 in preparation for the delivery of the three cases of bananas. For example, storage management system 426 turns on ethylene gas an hour before the expected arrival of the bananas and sends a notice to delivery control program 122 with the prepared and available storage space's location.

In addition to receiving a storage space for each product being delivered (e.g., lettuce and bananas), delivery control program 122 sends a request to a security system or a user at retailer XYZ for access to the storage areas (e.g., refrigerators 11A and 12A) and the retailer XYZ building housing refrigerators 11A and 12A. Delivery control program 122 sends the location of refrigerator compartments 11A and 12A to smart phone 440 along with any security codes received for entry into buildings and/or identified storage spaces at retailer XYZ.

Upon arrival at retailer XYZ, the driver of truck 450 begins unloading the cases of lettuce. Upon placing the cases of lettuce in the refrigerated compartment for storage, the driver, using a hand-held RFID scanner, scans the delivered cases of lettuce for shipping container identifications that are sent to delivery control program 122. Delivery control program 122 compares the scanned location for the ten cases of lettuce with the location provided by storage management system 426 and determines that the two locations do not match. Delivery control program 122 generates an alert such as an audio alert or beep to smart phone 440 and/or a text message smart phone 440 indicating that the ten cases of lettuce (e.g., placed in refrigerator compartment 10A) are not in the correct identified storage space. In response, the driver moves the ten cases of lettuce to the correct location in refrigerator compartment 11A. The three cases of bananas are placed in refrigerator compartment 12A and scanned. Delivery control program 122 verifies the bananas were placed in the correct storage location and that all cases (13 cases total) have been delivered to retailer XYZ. Delivery control program 122 may send a notification of delivery to server 420A at produce supplier A, server 420B and to smart phone 440 with the transporter indicating a delivery time, delivery quantity and a delivery location for each product placed in the identified storage space at retailer XYZ.

Figure 5:
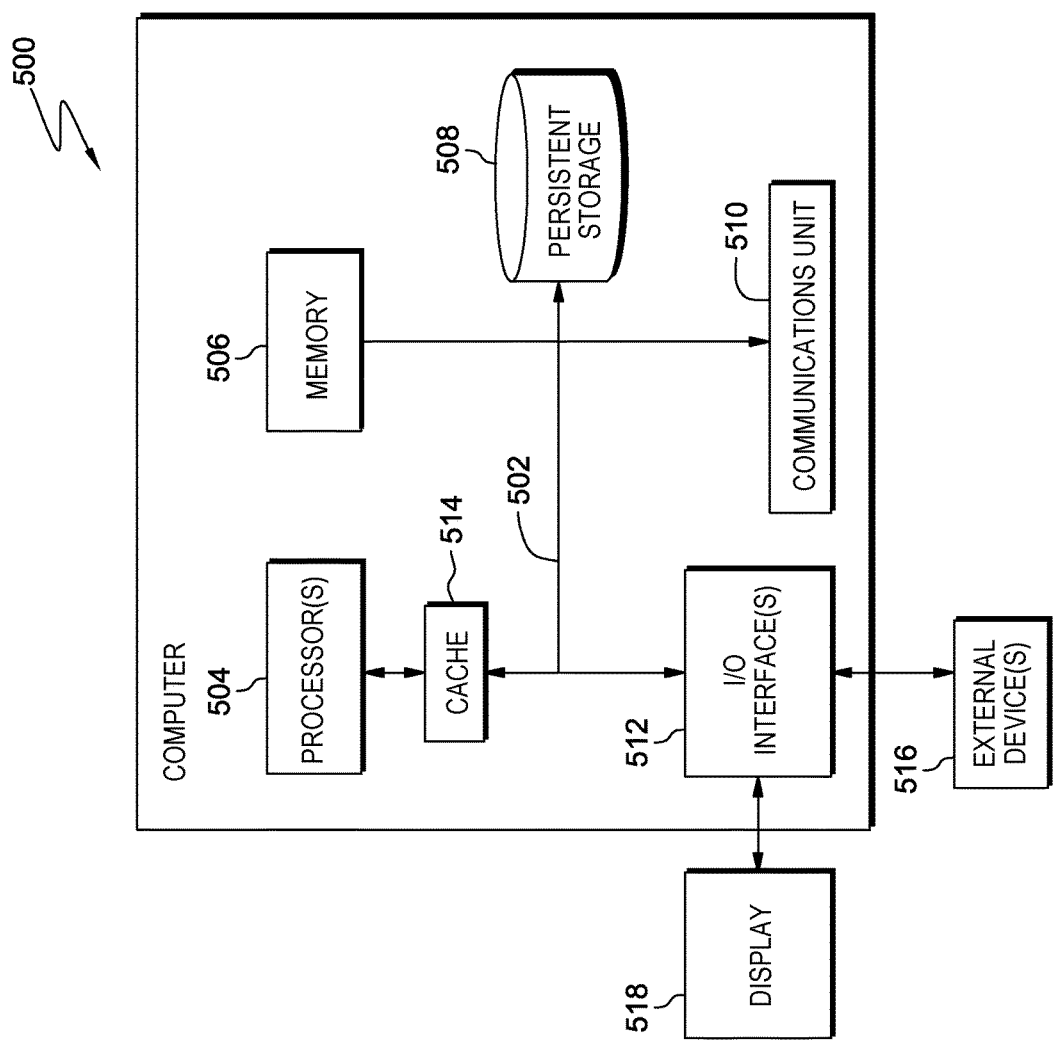
FIG. 5 is a block diagram depicting components of a computer system in a distributed data processing environment, in accordance with at least one embodiment of the present invention.

FIG. 5 depicts a block diagram 500 of components of a computer system, which is an example of a system such as server 120A, server 120B or smart device 140 within distributed data processing environment 100, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Server 120A, server 120B and smart device 140 each can include processor(s) 504, cache 514, memory 506, persistent storage 508, communications unit 510, input/output (I/O)

interface(s) 512 and communications fabric 502. Communications fabric 502 provides communications between cache 514, memory 506, persistent storage 508, communications unit 510 and input/output (I/O) interface(s) 512. Communications fabric 502 can be implemented with any architecture designed for passing data and/or control information between processors (such as microprocessors, communications and network processors, etc.), system memory, peripheral devices and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data and near recently accessed data, from memory 506.

Program instructions and data used to practice embodiments of the present invention are stored in persistent storage 508 for execution and/or access by one or more of the respective processor(s) 504 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory or any other computer readable storage media that is capable of storing program instructions or digital information.

The media used by persistent storage 508 may also be removable. For example, a removable hard drive may be used for persistent storage 508. Other examples include optical and magnetic disks, thumb drives and smart cards that are inserted into a drive for transfer onto another computer readable storage medium that is part of persistent storage 508.

Communications unit 510, in these examples, provides for communications with other data processing systems or devices, including resources of server 120A, server 120B and smart device 140 and other computing devices not shown in FIG. 1. In these examples, communications unit 510 includes one or more network interface cards. Communications unit 510 may provide communications with either or both physical and wireless communications links. Program instructions and data used to practice embodiments of the present invention may be downloaded to persistent storage 508 through communications unit 510.

I/O interface(s) 512 allows for input and output of data with other devices that may be connected to server 120A, server 120B and smart device 140. For example, I/O interface(s) 512 may provide a connection to external device(s) 516 such as a keyboard, a keypad, a touch screen, a microphone, a digital camera and/or some other suitable input device. External device(s) 516 can also include portable computer readable storage media, for example, devices such as thumb drives, portable optical or magnetic disks and memory cards. Software and data used to practice embodiments of the present invention can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor. Display 518 can also function as a touchscreen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops and PDAs).

Resource pooling: the providers' computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage, deployed applications and possibly limited control of select networking components (e.g., host firewalls).

Deployment Models are as follows:

Private cloud: the cloud infrastructure operates solely for an organization. It may be managed by the organization or a third party and may exist on-premises or off-premises.

Community cloud: the cloud infrastructure is shared by several organizations and supports a specific community that has shared concerns (e.g., mission, security requirements, policy and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing between clouds).

A cloud computing environment is service oriented with a focus on statelessness, low coupling, modularity and semantic interoperability. At the heart of cloud computing is an infrastructure that includes a network of interconnected nodes.

Figure 6:
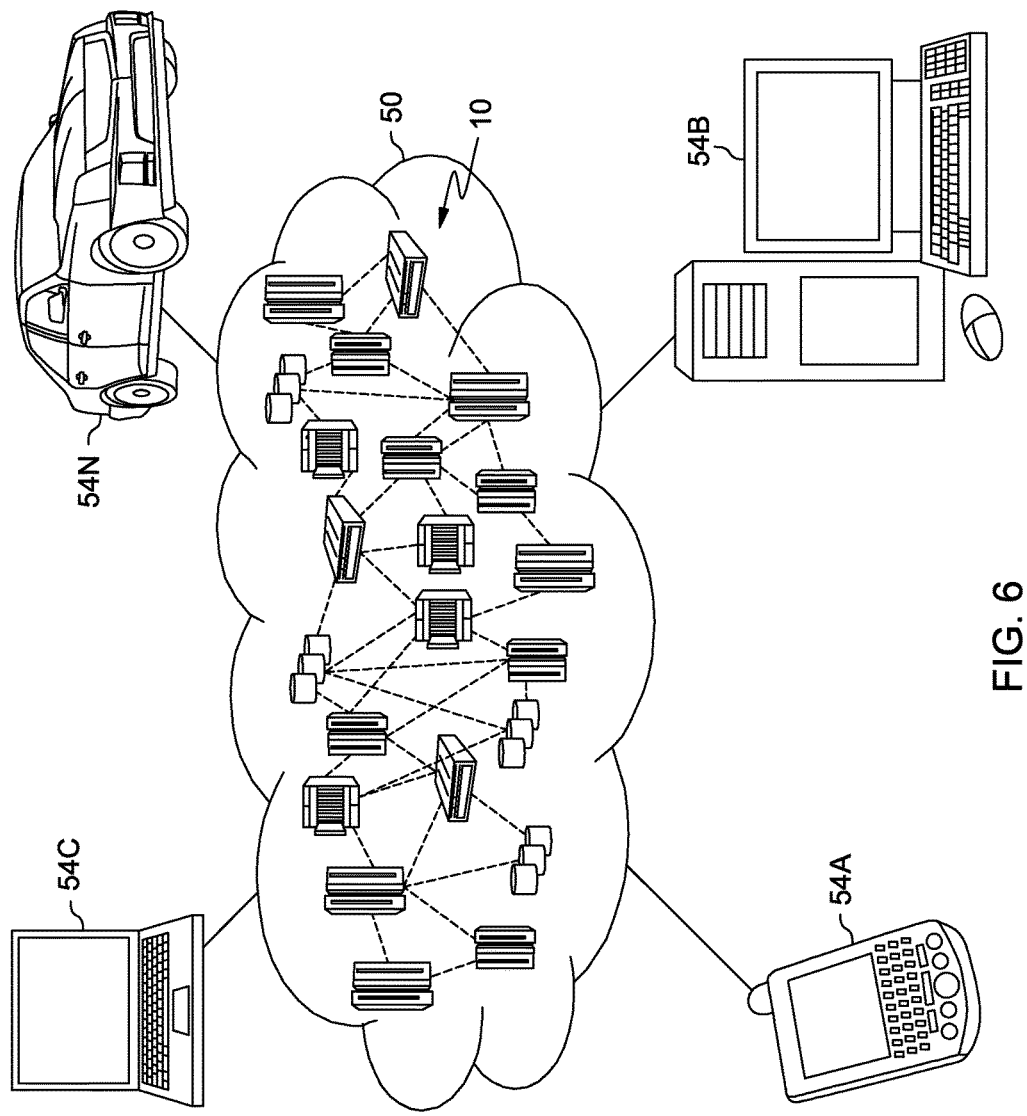
FIG. 6 depicts a cloud computing environment, in accordance with at least one embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that cloud computing nodes 10 and cloud computing environment 50 can communicate with any type of computerized device over any type of network and/or network addressable connection (e.g., using a web browser).

Figure 7:
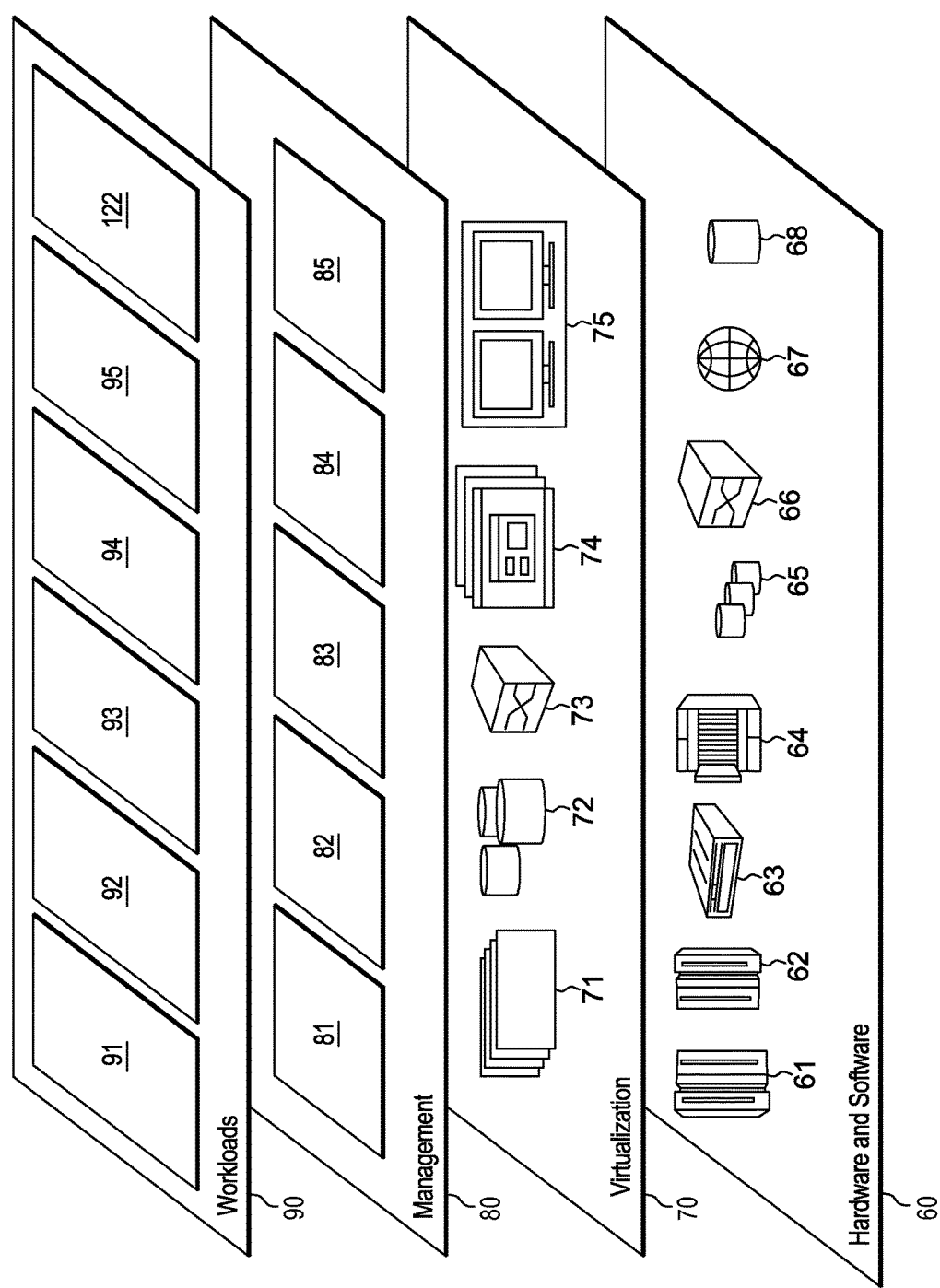
FIG. 7 depicts abstraction model layers, in accordance with at least one embodiment of the present invention.

Referring now to FIG. 7, a set of functional abstraction layers provided by cloud computing environment 50 (FIG. 6) is shown. It should be understood in advance that the components, layers and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65 and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74 and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and delivery control program 122.

The programs described herein are identified based upon the application for which they are implemented in a specific embodiment of the invention. However, it should be appreciated that any particular program nomenclature herein is used merely for convenience and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device. The computer readable program instructions may cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

What is claimed is:

1. A method comprising: identifying, by one or more processors, at least one product for delivery; creating, by one or more processors, a shipping manifest for the at least one product; extracting, by one or more processors, from the shipping manifest, a required amount of storage space for the at least one product and one or more environmental conditions required for storage of the at least one product at a receiving location; determining, by one or more computer processors, whether a storage space location for storage of the at least one product is available at the receiving location by querying a warehouse management system, wherein the identified storage space location provides the required amount of storage space and the one or more environmental conditions required for the at least one product; responsive to determining that the storage space location for storage of the at least product is not available at the receiving location with the required amount of storage space and the one or more environmental conditions required for the at least one product, sending, by one or more computer processors, a command for storage space preparation to the warehouse management system, wherein the command includes automatically changing a size of a storage space at the storage space location by moving one or more movable thermal curtains to create the identified storage space location.

2. The method of claim 1, further comprising:
providing, by one or more processors, the identified storage space location at the receiving location to a deliverer of the at least one product.

3. The method of claim 2, wherein providing, by one or more processors, the identified storage space location at the receiving location to the deliverer of the at least one product further comprises providing, by one or more processors, access to the identified storage space location to the deliverer at an expected arrival time for delivery of the at least one product.

4. The method of claim 1, wherein the one or more environmental conditions required for storage of the at least one product include one or more of: a required temperature, one or more humidity levels, a vibration level, and an atmosphere condition.

5. The method of claim 1, wherein creating, by one or more processors, the shipping manifest for the at least one product further comprises providing, by one or more processors, the shipping manifest to at least a supplier location and the receiving location.

6. The method of claim 1, wherein the shipping manifest includes at least one of a product name for the at least one product, a product number for the at least one product, a quantity of the at least one product for delivery, one or more shipping container sizes for the at least one product, a quantity of at least one shipping container for the at least one product in a shipment, a quantity of the at least one product in the one or more shipping container sizes, an identifier for each shipping container of the at least one product, a quantity of the at least one shipping container for the at least one product, one or more environmental conditions required for storage of the at least one product and the receiving location for the at least one product.

7. The method of claim 1, wherein creating, by one or more processors, a shipping manifest for the at least one product further comprises:
retrieving, by one or more processors, from a database including product specification information, one or more shipping container sizes for the least one product based on one of a product name and a product number;
retrieving, by one or more processors, from the database including product specification information, a quantity of the least one product associated with each of the one or more shipping container sizes;
identifying, by one or more processors, a number of shipping containers for the one or more shipping container sizes for the at least one product for delivery to storage based on information extracted from one of a purchase order or a shipping request identifying the at least one product for delivery to the receiving location;
determining, by one or more processors, the required amount of storage space for the at least one product, based at least in part, on the number of shipping containers and the one or more shipping container sizes of the at least one product;
receiving, by one or more processors, a shipping container identifier for each of at least one shipping containers for the at least one product wherein the shipping container identifier is one of: a radio frequency identification tag, a near field communication tag, a tag, a barcode or a wireless device included in each of the at least one shipping containers for the at least one product;
retrieving, by one or more processors, from a database including product specification information, one or more environmental conditions required for storage of the at least one product; and
recording, by one or more processors, the retrieved number of shipping containers for the one or more shipping container sizes, the required amount of storage space for the at least one product, the shipping container identifier for each of the at least one shipping containers for the at least one product, and the one or more environmental conditions required for the at least one product in the shipping manifest.

8. The method of claim 1, further comprises:
scanning, by one or more processors, each of at least one shipping container of the at least one product delivered to storage;
recording, by one or more processors, a quantity of the scanned at least one shipping containers of the at least one product delivered to storage;
extracting, by one or more processors, a quantity of the at least one shipping container for delivery to the receiving location from the shipping manifest; and
verifying, by one or more processors, whether the quantity of the scanned at least one shipping containers for the at least one product delivered to storage matches the extracted quantity of the at least one shipping container for the at least one product from the shipping manifest.

9. The method of claim 8, further comprises: in response to determining that the quantity of the scanned at least one shipping containers of the at least one product matches the extracted quantity of the at least one shipping containers from the shipping manifest, notifying, by one or more processors, at least a supplier sending the at least one product, the receiving location, and a transporter who placed the shipping container of the at least one product in the identified space of the delivery of the at least one product.

10. The method of claim 1, further comprises:
determining, by one or more processors, a location of each of at least one shipping container of the at least one product based, at least in part, on a scan of each of the at least one shipping containers delivered to storage;
recording, by one or more processors, the location of each of the scanned at least one shipping container of the at least one product delivered to storage;
comparing, by one or more processors, the location of each of the scanned at least one shipping container of the at least one product delivered to storage and the identified storage space location of the at least one product; and
verifying, by one or more processors, that the location for each of the scanned at least one shipping containers delivered to storage matches the identified storage space location of the at least one product.

11. The method of claim 10, in response to determining that the location of at least one of the scanned at least one shipping containers delivered to storage does not match the location of the identified storage space location for each of the at least one product, sending, by one or more processors, an alert to a smart device used by the deliverer informing the deliverer of an error in the location of the at least one of the scanned at least one shipping container.

12. The method of claim 1, wherein determining, by one or more computer processors, a storage space location for storage of the at least one product at the receiving location further comprises:
- extracting, by one or more processors, a shipping container identification for each of at least one shipping containers of the at least one product from the shipping manifest;
- scanning, by one or more processors, each of the at least one shipping containers of the at least one product delivered to storage to determine at least one shipping container identification;
- determining, by one or more processors, that the scanned at least one shipping container identification matches one of an extracted shipping container identification for the least one shipping containers of the at least one product from the shipping manifest; and
- responsive to determining that the scanned at least one shipping container identification matches one of the extracted shipping container identifications for the least one shipping containers of the at least one product from the shipping manifest, providing, by one or more processors, access to the identified storage space location.

13. The method of claim 1, wherein determining whether the storage space location for storage of the at least one product is available at the receiving location by querying the warehouse management system includes providing, by one or more processors, a request to separate one or more spaces within a storage space by moving curtains to provide an isolated location for the identified space location that can provide the one or more environmental conditions, wherein the one or more environmental conditions are one of the temperature or a humidity.

14. The method of claim 1, further comprises: sending, by one or more processors, a request to warehouse management system to create the identified storage space location of the at least one product at the receiving location, wherein the request includes determining whether current products in a refrigerated space can be stored at the required temperature of the at least one product by checking one or more of a product specification database or a shipping manifest database; and responsive to determining that the current products in the refrigerated space can be stored at the required temperature, changing, by one or more computer processors, a temperature in the refrigerated space to the required temperature of the at least one product to create the identified storage space location.

15. The method of claim 1, further comprising:
- determining, by one or more processors, a location of a transporter of the at least one product; and
  - alerting, by one or more processors, the receiving location of an expected arrival time of the at least one product.

16. A computer program product comprising: one or more computer readable storage media and program instructions stored on the one or more computer readable storage media, the program instructions executable by a processor, the program instructions comprising instructions for: identifying at least one product for delivery; creating a shipping manifest for the at least one product; extracting from the shipping manifest, a required amount of storage space for the at least one product and one or more environmental conditions required for storage of the at least one product at a receiving location; determining whether a storage space location for storage of the at least one product is available at the receiving location by querying a warehouse management system, wherein the identified storage space location provides the required amount of storage space and the one or more environmental conditions required for the at least one product; responsive to determining that the storage space location for storage of the at least product is not available at the receiving location with the required amount of storage space and the one or more environmental conditions required for the at least one product, sending a command for storage space preparation to the warehouse management system, wherein the command includes automatically changing a size of a storage space at the storage space location by moving one or more movable thermal curtains to create the identified storage space location.

17. The computer program product of claim 16, further comprising:
- providing a location of the identified storage space location at the receiving location to a deliverer of the at least one product.

18. The computer program product of claim 16, wherein the one or more environmental conditions required for storage of the at least one product include one or more of: a required temperature, one or more humidity levels, a vibration level, and an atmosphere condition.

19. A computer system comprising: one or more computer processors; one or more computer readable storage media; and program instructions stored on the one or more computer readable storage media for execution by at least one of the one or more processors, the program instructions comprising instructions to perform: identifying at least one product for delivery; creating a shipping manifest for the at least one product; extracting from the shipping manifest, a required amount of storage space for the at least one product and one or more environmental conditions required for storage of the at least one product at a receiving location; determining whether a storage space location for storage of the at least one product is available at the receiving location by querying a warehouse management system, wherein the identified storage space location provides the required amount of storage space and the one or more environmental conditions required for the at least one product; responsive to determining that the storage space location for storage of the at least product is not available at the receiving location with the required amount of storage space and the one or more environmental conditions required for the at least one product, sending a command for storage space preparation to the warehouse management system, wherein the command includes automatically changing a size of a storage space at the storage space location by moving one or more movable thermal curtains to create the identified storage space location.

20. The computer system of claim 19, further comprising:
- providing the identified storage space location for storage of the at least one product at the receiving location to the deliverer; and
- providing access to the identified storage space location for storage to the deliverer for delivery of the at least one product.

* * * * *